UNITED STATES PATENT OFFICE.

SPENCER B. NEWBERRY, OF CLEVELAND, OHIO.

REFRACTORY FURNACE-LINING AND PROCESS OF MAKING.

1,267,686.  Specification of Letters Patent.  Patented May 28, 1918.

No Drawing.  Application filed June 25, 1917.  Serial No. 176,850.

*To all whom it may concern:*

Be it known that I, SPENCER B. NEWBERRY, a citizen of the United States, and residing at Cleveland, Cuyahoga county, State of Ohio, have invented certain new and useful Improvements in Refractory Furnace-Lining and Processes of Making, of which the following is a specification.

This invention relates to the production of a basic material for use in lining furnaces for the manufacture of steel and also for other purposes. It is well known that magnesian lime, made by calcining dolomite or magnesian limestone, mixed with tarry matter, is widely used for the lining of steel furnaces and the like. This calcined dolomite has, however, the drawback of slaking rapidly on exposure to air, thus causing inconvenience and loss. This obstacle has to some extent been overcome by the use of calcined dolomite made from impure magnesian limestones containing a considerable percentage of silicious matter. Such products have the defect of being variable in composition and consequently of uncertain stability and heat-resisting properties. It is found also that any considerable percentage of silica in the material lessens its durability and effectiveness in use, since one of the important functions of the lining is the extraction of silicon, in the form of fusible silicates, from the metal treated. A calcined dolomite substantially free from silica, and at the same time of good density and free from tendency to slake on storage, would therefore be a highly superior material for the service required.

With a view to producing a lining material of better quality than any heretofore employed, I have conducted a long series of experiments in the calcination of artificial mixtures of dolomite with various fluxing agents substantially free from silica, and have found that certain metallic oxids, such as alumina and iron oxid, have a remarkable capacity for fluxing and fixing the lime of dolomite, and thus overcoming the tendency of the product to slake or disintegrate on exposure to air or moisture. Owing to the great fusibility of the aluminates and ferrites of lime, a much smaller percentage of alumina or iron oxid is required, than of silicious material, such as clay, to give a sufficient degree of sintering. For example, I have obtained thoroughly hard and dense clinker, which showed no tendency to slake after several weeks' immersion in water, by calcining a pure dolomite with only three per cent. of its weight of alumina or iron oxid, respectively. The products show extraordinary resistance to heat, and appear to be fully as refractory as calcined magnesite. Applicant believes that this sintered dolomite lime, containing as little as two to three per cent. of alumina or iron oxid, when molded into bricks and reburned at high heat, will prove an effective substitute for the much more costly magnesite brick.

Other metallic oxids which I find effective in fluxing or sintering dolomite lime to a dense clinker are the oxids of chromium, manganese, cobalt and nickel. Although these oxids are quite expensive, it is possible that they might be used, in the small proportion required, for certain special purposes. The non-metallic oxid of boron, boric anhydrid, $B_2O_3$, has a similar effect.

The metallic oxids above named are classified by Fresenius as belonging to the aluminum-iron group, and by the term "oxids of the aluminum-iron group", I refer especially to alumina and iron oxid, but intend to include also the other oxids mentioned.

It will be noted that the oxids named are all capable, in their higher degrees of oxidation, of forming fusible compounds with lime, and I wish it to be understood that all substances which produce this effect, with the exception of silica, are included in this invention.

It is also understood that pure limestone or limestone lower in magnesia than dolomite, may be used in place of dolomite, provided the percentage of fluxing material added is increased substantially in proportion to the lime present.

I do not wish to restrict my invention to any definite proportions of fluxing oxids, as this may be varied according to the ease and degree of sintering and refractory qualities desired. I consider, however, that the limits of two to ten per cent. of fluxing oxids would include the proportions which will be found practically useful.

It is also understood that calcined lime or calcined magnesian lime, in equivalent proportions, may be used in place of limestone or dolomite.

As a practical example of my process, I take dolomite or magnesian limestone, which should be as free as possible from silicious impurities, and grind it, with the addition of two to five per cent. of its weight of alumina, iron oxid, or the other oxids above named, or of a mixture of these oxids. Bauxite and iron ore are sufficiently pure forms of alumina and iron oxid. The grinding is preferably done by wet process and is continued until the mixture practically all passes a sieve of 100 meshes per linear inch or to still greater fineness. The finely-ground mixture is then burned, in a manner similar to the burning of Portland cement, in a rotary kiln, or the mixture is dried, broken into pieces of suitable size or molded into blocks, and burned in continuous vertical kilns. The degree of heat required varies inversely with the percentage of fluxing oxids present: With three per cent. of alumina or iron oxid, for example, a temperature of 2,700 degrees to 3,000 degrees F. will be necessary, to give a well sintered product, while with a larger percentage of flux a somewhat lower temperature will be found sufficient.

The product issues from the kiln in the form of dense, hard masses. These are crushed to any desired size and employed as usual in the making of furnace linings.

Having thus described my invention, what I claim and desire to secure by Letters Patent is:—

1. The process of making basic refractory material for furnace lining, consisting in mixing and grinding limestone with a small percentage of oxids capable of forming fusible compounds with lime substantially free from silica, and calcining the mixture to a dense, sintered clinker.

2. The process of making basic refractory material for furnace lining, consisting in mixing and grinding magnesian limestone with a small percentage of oxids capable of forming fusible compounds with lime substantially free from silica, and calcining the mixture to a dense, sintered clinker.

3. The process of making basic refractory material for furnace lining, consisting in mixing and grinding magnesian limestone with a small percentage of oxids of the aluminum-iron group substantially free from silica, and calcining the mixture to a dense, sintered clinker.

4. The process of making basic refractory material for furnace lining, consisting in mixing and grinding magnesian limestone with a small percentage of an oxid of the aluminum-iron group substantially free from silica, and calcining the mixture to a dense, sintered clinker.

5. The process of making basic refractory material for furnace lining, consisting in mixing and grinding magnesian limestone with a small percentage of alumina and iron oxid substantially free from silica, and calcining the mixture to a dense, sintered clinker.

6. The process of making basic refractory material for furnace lining, consisting in mixing and grinding magnesian limestone with two to ten per cent. of oxids of the aluminum-iron group substantially free from silica, and calcining the mixture to a dense, sintered clinker.

7. The process of making basic refractory material for furnace lining, consisting in mixing and grinding magnesian limestone with 2 to 10 per cent. of oxids of the aluminum-iron group substantially free from silica, and calcining the mixture at a temperature of 2700 degrees to 3000 degrees F. to a dense, sintered clinker.

8. A basic refractory material consisting of lime combined with a small percentage of oxids of the aluminum-iron group substantially free from silica.

9. A basic refractory material consisting of magnesian lime combined with a small percentage of oxids of the aluminum-iron group substantially free from silica.

10. A basic refractory material consisting of magnesian lime combined with a small percentage of an oxid of the aluminum-iron group substantially free from silica.

11. A basic refractory material consisting of magnesian lime combined with two to ten per cent. of oxids of the aluminum-iron group substantially free from silica.

12. A basic refractory material consisting of magnesian lime with 2 to 10 per cent. of oxids of the aluminum-iron group substantially free from silica in dense and sintered condition.

13. A basic refractory material consisting of magnesian lime with 2 to 10 per cent. of an oxid of the aluminum-iron group substantially free from silica in dense and sintered condition.

In testimony whereof I affix my signature.

SPENCER B. NEWBERRY.